July 28, 1942.  F. T. PARRISH  2,291,557

WHEEL MOUNTING

Filed March 6, 1941

Inventor:
Frank T. Parrish
By Charles P. Warren
Attorney

Patented July 28, 1942

2,291,557

UNITED STATES PATENT OFFICE 2,291,557

WHEEL MOUNTING

Frank T. Parrish, Gardner, Mass., assignor to Heywood-Wakefield Company, Gardner, Mass., a corporation of Massachusetts Application March 6, 1941, Serial No. 381,943

7 Claims. (Cl. 301—112)

The present invention relates to devices employed for detachably holding a vehicle wheel on its axle and is especially adapted for wheel mountings for baby carriages and the like.

In prior devices of this character the wheel has generally been held in place, either by a cotter pin extending through the outer end of the axle, or by a latch attached to the axle and adapted to engage a flange on the hub of the wheel. In either case the mounting of the wheel on the axle has necessitated manipulation of the latch or insertion of the cotter pin to make sure that the wheel is properly in position on, and locked against removal from, the axle. The principal object of the present invention is to provide a device which automatically locks the wheel on the axle merely by the act of sliding the wheel endwise onto the axle.

In accordance with the present invention, the axle has formed therein, adjacent its outer end, a groove or notch which receives the wheel locking member. This member is resilient and can be compressed into the groove in the axle as the wheel is placed in position and will then move outwardly to engage with the outer end of the wheel hub and prevent inadvertent removal of the wheel.

It is desirable to provide for crating baby carriages with the wheels removed from the axles in order to reduce to a minimum the required size of the shipping crates and, with this in mind, it is essential that the wheel mounting be such that the wheels may be easily mounted upon the axles with as little effort as possible. One of the features of the present invention resides in a wheel mounting which permits the wheel to be readily mounted on the axle and securely held in position by no further manipulation than the act of sliding the wheel as far as possible onto the axle.

Other and further objects and advantages of the invention will hereinafter more fully appear in the following detailed description taken in connection with the accompanying drawing, in which—

Figure 1:
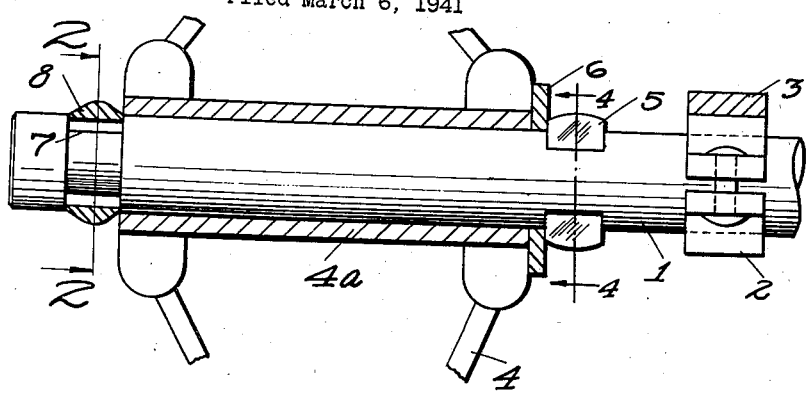
Fig. 1 is a sectional view through a wheel and axle in which the present invention is embodied.
Figure 1:
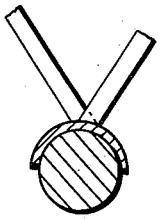
Figure 2:
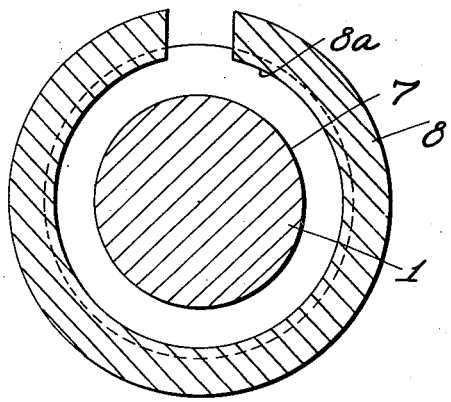
Fig. 2 is a sectional view along the line 2—2 of Fig. 1.

Referring first to Fig. 1, the axle 1 for the baby carriage or other vehicle is held, as by clips 2, to the under carriage 3 of the vehicle so that the axle does not rotate. Although the axle may be round or square in cross section between its ends, the wheel receiving ends thereof are cylindrical. In the arrangement shown, the axle is cylindrical throughout its entire length.

The hub 4a of the wheel 4 is adapted to be positioned over the wheel receiving end of the axle for rotation thereon. At the inner end of the wheel hub, the axle has protuberances 5 extending outwardly from the axle to engage with the end of the wheel hub or with a washer 6 positioned at the inner end of the hub to prevent endwise movement of the wheel on the axle.

Figure 3:
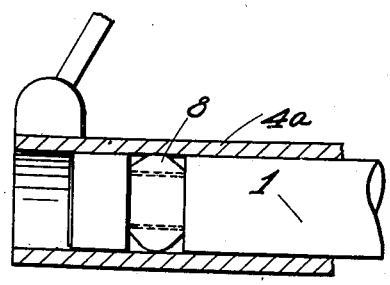
Fig. 3 is a fragmentary sectional view corresponding to Fig. 1 and showing the wheel only partially in position on the axle.
Figure 4:
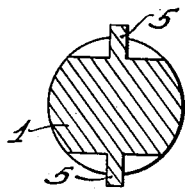
Fig. 4 is a sectional view through the axle along the line 4—4 of Fig. 1.

Adjacent the opposite end of the wheel hub, the axle 1 has an annular groove 7 therein to receive a split resilient ring 8, the inner surface of which is normally of slightly larger diameter than the diameter of the groove 7, but of less diameter than the axle itself. Thus the outer surface of the ring normally extends beyond the periphery of the axle and the ring remains securely in the groove 7. The outer surface of the ring 8 is beveled, as shown, so that as the wheel is slid onto the axle, the hub thereof will engage with the arcuate surface of the ring and compress the ring into the groove 7. When the wheel has been slid onto the axle to the operative position of Fig. 1, the ring 8, being resilient, returns to the position of Fig. 1 to hold the wheel releasably against removal from the axle. It will be obvious that the depth of the groove 7 is at least as great as the thickness of the ring 8 so that the entire ring may be compressed into the groove, as shown in Fig. 3, when the wheel is being mounted.

It will be apparent that the ring 8 securely locks the wheel in position and presents an almost continuous annular surface engageable with the end of the wheel hub. This annular surface is substantially larger than the surface presented by a cotter pin and will therefore resist wear for a much longer period. If removal of the wheel from the axle is necessary, the beveled outer surface of the ring 8 permits the wheel to be removed by an endwise pull on the wheel, although this endwise pull must obviously be considerably greater than the end thrust that might be exerted on the wheel in the normal use of the vehicle.

When a carriage is shipped with the wheels dismounted, the only assembly necessary is a positioning of the wheels on the axles as far as possible, or until the ring 8 appears at the outer side of the wheel hub. No tools, or manipulation of either wheel or axle are necessary, and the mounting of the wheels may be done in a very short time without any possibility that the wheels are not properly mounted.

The ring 8 is necessarily freely turnable in the groove and when engaged by the end of the wheel hub may act as a thrust bearing and rotate with the wheel, thereby reducing the wear on the ring.

I claim:

1. In a wheel mounting, an axle having a groove adjacent the end thereof, a resilient ring in the groove and normally projecting partially beyond the periphery of the axle, and a wheel having a hub positionable on the axle and engageable with the ring for retaining the wheel on the axle, said ring being split to be substantially entirely compressible into the groove during the positioning of the wheel on the axle, the depth of the groove in the axle being as great as the thickness of the ring to receive substantially all of the ring therein.

2. In a wheel mounting, an axle having a groove adjacent the end thereof, a resilient ring in the groove and normally projecting partially therefrom, and a wheel having a hub positionable on the axle and engageable with the ring for retaining the wheel on the axle, said ring having its outer corner beveled to provide for compression of the spring by the wheel hub during the positioning of the wheel on the axle, the depth of the groove being as great as the thickness of the ring, whereby the ring may be substantially entirely compressed into the groove during the mounting of the wheel on the axle.

3. In a wheel mounting, a wheel having a hub, an axle over which the wheel hub is positionable, said axle having, projecting therefrom, means engageable with the wheel hub for limiting the endwise movement of the wheel hub in one direction, said axle also having a groove spaced from said means, and a resilient ring in said groove and normally projecting therefrom, said ring being engageable with the wheel hub for limiting its endwise movement in the other direction, said groove being at least as deep as the thickness of the ring to receive substantially the entire ring therein during the mounting of a wheel on the axle.

4. In a wheel mounting, a wheel having a hub, an axle over which the wheel hub is positionable, said axle having, projecting therefrom, means engageable with the wheel hub for limiting the endwise movement of the wheel hub in one direction, said axle also having a groove spaced from said means, and a ring in said groove and normally projecting therefrom, said ring being engageable with the wheel hub for limiting its endwise movement in the other direction, said ring being resilient and of a dimension to be substantially entirely received in the groove when compressed to permit mounting of the wheel on the axle without removal of the ring from the groove.

5. In a wheel mounting, a wheel having a hub, an axle over which the wheel hub is positionable, said axle having, projecting therefrom, means engageable with the wheel hub for limiting the endwise movement of the wheel hub in one direction, said axle also having a groove spaced from said means, and a ring in said groove and normally projecting partially therefrom, said ring being engageable with the wheel hub for limiting its endwise movement in the other direction, said ring being resilient and of a dimension to be substantially entirely received in the groove when compressed to permit mounting of the wheel on the axle, the outer surface of the ring being beveled to provide for compression of the ring into the groove by the action of positioning the wheel on the axle.

6. The combination with an axle having a groove therein, a resilient split ring in said groove, said ring having a cross-sectional area smaller than the cross-sectional area of the groove, and means projecting from said axle in spaced relation to said groove, of a wheel having a hub positionable on said axle, said ring being substantially entirely compressible into the groove by the act of positioning the wheel hub on said axle, and said ring normally projecting partially from the groove for locking the wheel on the axle when the hub of the wheel is between the ring and said means on the axle.

7. The combination with an axle having a groove therein, a resilient split ring normally extending beyond the periphery of the axle and positioned in said groove, said ring having a cross-sectional area smaller than the cross-sectional area of the groove, and means projecting from said axle in spaced relation to said groove, of a wheel having a hub positionable on said axle, said ring being substantially entirely compressible into the groove by the act of positioning the wheel hub on said axle, and said ring, when expanded to its normal position, locking the wheel on the axle when the hub of the wheel is between the ring and said means on the axle, the outer corner of said ring being beveled to provide for compression of the ring by engagement between said ring and the wheel hub in the mounting of a wheel on the axle.

FRANK T. PARRISH.